Jan. 3, 1956  W. J. REESE  2,729,129
GRIPPING MEANS FOR A TORSION TESTING MACHINE OR THE LIKE
Filed Dec. 15, 1953  2 Sheets-Sheet 1

INVENTOR
William J. Reese

Synnestvedt & Lechner
ATTORNEYS

INVENTOR
William J. Reese
Synnestvedt & Lechner
ATTORNEYS

United States Patent Office 2,729,129
Patented Jan. 3, 1956

2,729,129

GRIPPING MEANS FOR A TORSION TESTING MACHINE OR THE LIKE

William J. Reese, Philadelphia, Pa., assignor to Tinius Olsen Testing Machine Company, Willow Grove, Pa., a corporation of Pennsylvania Application December 15, 1953, Serial No. 398,250

5 Claims. (Cl. 81—179)

This invention relates to gripping means for a vice or a wrench or the like, and in particular is concerned with gripping means which will positively lock when relative twisting motion is effected between a pipe and a vice.

The principal object of the invention is to provide such positively-locking gripping means which are self-tightening or self-energizing in opposite directions of twist. By opposite directions of twist is meant twisting of the pipe in a clockwise or counter-clockwise direction and/or twisting of the vice in either of said directions.

The invention will be described in connection with a torsion twisting machine, although, as will be more apparent as the description proceeds, the invention has a wide variety of applications.

In general, a torsion twisting machine comprises two vice-like heads disposed in face-to-face relationship, one of which is fixed against rotation and the other connected to mechanism whereby it may be rotated in a clockwise or counter-clockwise direction. Each head is equipped with gripping means for securing an object such as a pipe or a rod therebetween whereby the object may be torsion twisted.

In applying the present invention to such a machine, each head is generally cylindrical in shape and is equipped with a diametrally extending slot at one end thereof. Within the slot are mounted two supports which are slidable in a radial direction toward and away from the axis of the head by manually operable screw mechanism. Thus, the supports may be manipulated so that a pipe may be inserted in the head. The inner end of each support is provided with a slot and within each slot is disposed a jaw which is slidable generally transversely to the radial direction of movement of the support. A jaw is provided with a V-type or wedge-like section carrying teeth on each leg thereof, the teeth being oriented generally transversely to the axis of the section. The teeth on each leg point generally away from a plane containing the bisector of the V.

A pipe is held in a head by moving the supports toward one another such that the teeth on the legs of the jaws respectively grip opposite sides of the pipe. When the pipe is twisted in say the clockwise direction, one jaw tends to move in one direction and the other jaw tends to move in the opposite direction. Thus, on a jaw the teeth on one leg move away from the pipe, while the teeth on the other leg intimately grip the pipe and by wedge-like action hold it against twisting. The same action takes place on the other jaw. If the pipe is twisted in the counter-clockwise direction, the teeth which previously gripped the pipe move away and the other teeth grip the pipe in the same wedging or self-locking manner as described.

This duo-directional wedging or self-locking or self-energizing action is an important part of the invention, as it has enabled me to greatly increase gripping capacity of torsion type machines.

Another important feature of the invention is the manner in which I have arranged or oriented the teeth along the V section. This has enabled me to greatly increase the ability of the jaws to grip as compared with cross cut teeth or teeth running parallel to the root of the V.

Another important feature of the invention is the manner in which the teeth are oriented with respect to a plane containing the bisector of the V. This is particularly helpful in my duo-directional arrangement because the teeth which do the gripping tend to dig into the pipe.

Another important feature of the invention is the providing of spring means to center the jaws in the support slots. Thus, the jaws are self-centering and this is particularly desirable when new test pieces are inserted, since the jaws do not have to be manipulated to the correct position for proper gripping.

How the foregoing is accomplished will be apparent from the following description and drawings wherein.

Figure 1:
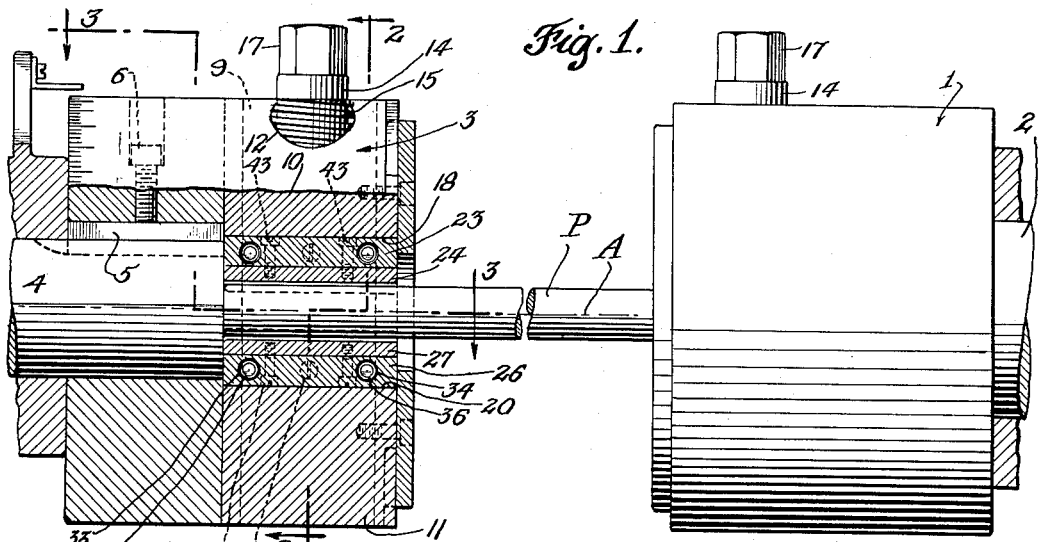
Figure 1 is a side view of the heads of a torsion testing machine with a pipe connected therebetween, the left-hand head being shown partially in elevation and partially in section on the line 1—1 of Figure 2, and the right-hand head being shown in elevation.

In Figure 1 the right-hand head 1 is supported on shaft 2 in a manner to be fixed against rotation. The left-hand head 3 is keyed to shaft 4 as by key 5, the head being held on the shaft by means of a bolt 6. The shaft 4 is ordinarily connected to mechanism providing for twisting of the head either clockwise or counter-clockwise. The letter P designates a pipe or a rod or the like connected between the heads.

The gripping means manipulated in the heads are identical in construction and the description will be given only with reference to the left-hand head 3.

Figure 2:
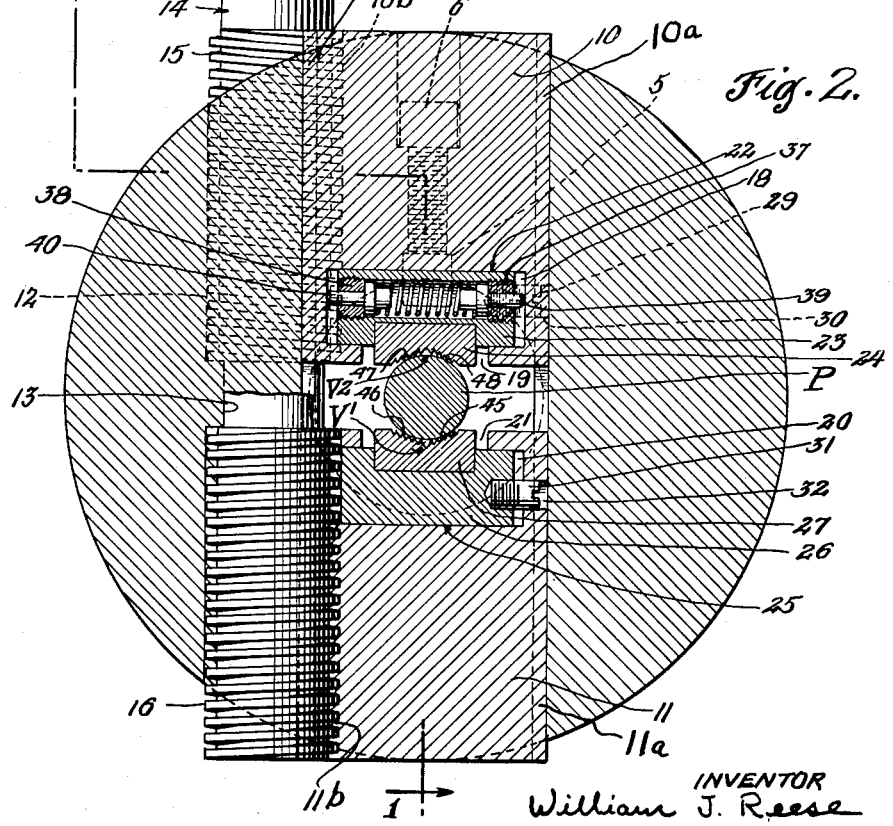
Figure 2 is an enlarged cross section taken substantially on the line 2—2 of Figure 1 showing the jaws in engagement with the pipe.
Figure 3:
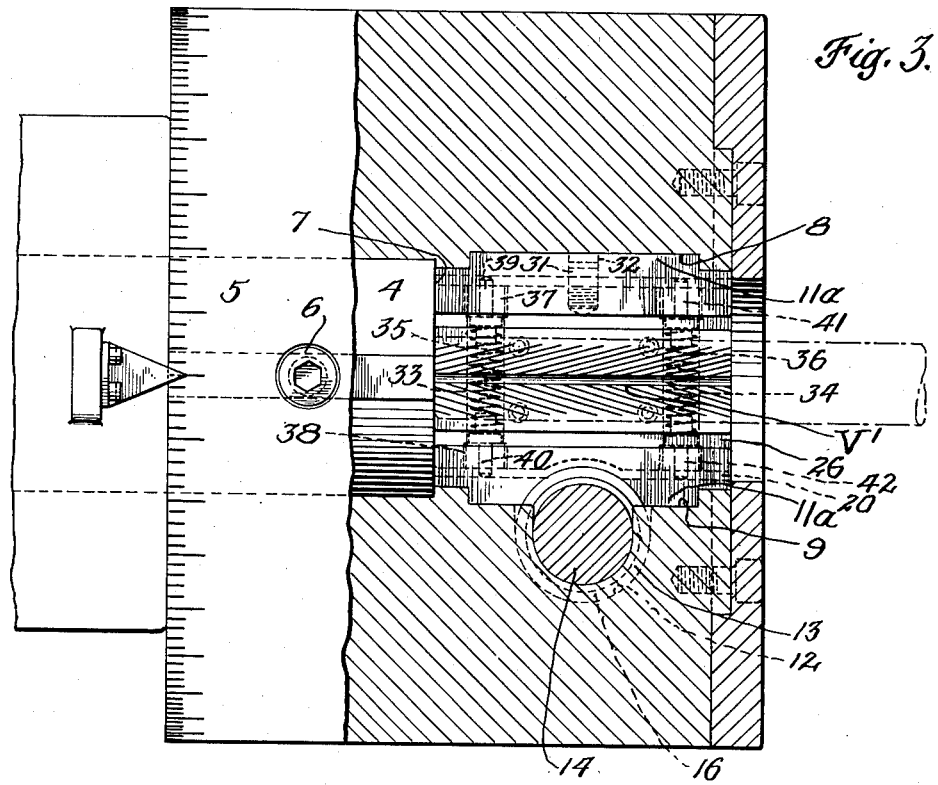
Figure 3 is in part a plan view and in part a plan section as indicated by the line 3—3 of Figure 1 showing in particular the orientation of the gripping teeth.

As seen in Figures 1, 2 and 3, the head 3 is provided with a diametrally extending slot generally designated by the numeral 7 and having recesses 8 and 9 at opposite sides thereof. Within the slot is disposed an upper support 10 and a lower support 11, which respectively have sections 10a—10a and 11a—11a extending into the recesses 8 and 9.

Also extending through the head is an aperture 12 having a ledge 13 which supports the screw 14 having upper threads 15 and lower threads 16, which respectively engage threads 10b and 11b of supports 10 and 11. The screw 14 has a nut 17, by which it may be turned. As will be apparent, when the screw is turned in a clockwise direction (as viewed in Figure 2), the supports will move away from one another radially outwardly of the axis A of the head. When the screw is turned in the counter-clockwise direction, the respective supports will move toward one another.

As seen in Figure 2, the support 10 is provided with a slot 18, which is open, as indicated at 19, to the axis of the head. The support 11 is provided with a slot 20, which is open, as indicated at 21, to the axis of the head. As seen in Figure 1, slots 18 and 20 extend the full length of the respective supports.

As seen in Figure 2, within the slot 18 of support 10 is mounted a jaw 22 comprising slider portion 23 and gripper portion 24. A similar jaw 25 having a slider 26 and a gripper 27 is mounted in slot 20 of support 11.

As seen in Figure 1, the slider 23 and the gripper 24 fully extend lengthwise along the slot 18 and the slider 26 and gripper 27 fully extend along the slot 20. However, as seen in Figure 2, the slider 23 and the gripper 24 are of a width somewhat less than the slot 18, and the slider 26 and gripper 27 are also of a width somewhat less than the slot 20. Thus, it will be apparent that the jaws 22 and 25 may be moved relative to the supports 10 and 11, either in the left or right-hand direction.

Lengthwise movement of the jaw 22 in the slot 18 is prevented by the stud 29, which is threaded in the slider 23 and extends into an aperture 30 in the support 10. Lengthwise movement of the jaw 25 is prevented by the stud 31 threaded into the slider 26 and extending into the aperture 32 in the support 11. The foregoing studs and apertures are arranged to accommodate left and right-hand movement of the jaws.

The jaw 25 is centered in the slot 20 by means of the following arrangement. As seen in Figure 3, the slider 26 is provided with aperture 33 and aperture 34. Within these apertures are disposed springs 35 and 36. At opposite ends of the aperture 33 are threaded nuts 37 and 38. The nuts 37 and 38 have holes accommodating the abutments 39 and 40, which respectively extend outwardly and abut the opposite sides of the slot 20. Abutments 41 and 42 are provided at the ends of the aperture 34 in a similar manner. An identical arrangement as that described above is provided for centering of the jaw 22 (see Figure 2).

As will be apparent, if the jaws 22 or 25 are moved in either direction, the springs will be compressed by the abutments and when the moving force is removed, the jaws will return to the center position.

The gripper 24 is secured to the slider 23 by means of the bolts 43—43 while the gripper 27 is attached to the slider 26 by means of the bolts 44—44.

Figure 4:
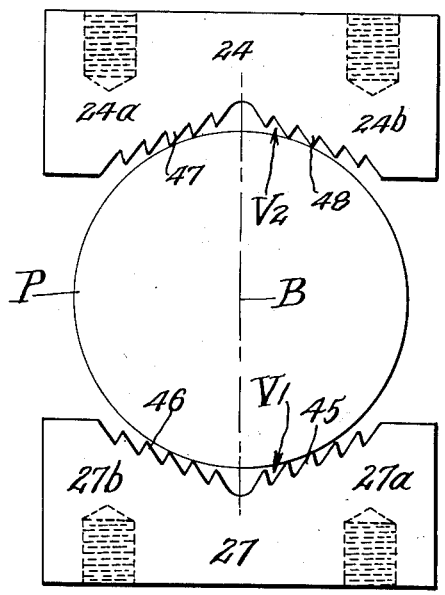
Figure 4 is a still further enlarged view of the gripping jaws.

As will be apparent from an inspection of Figures 2, 3 and 4, the gripper 27 is provided with a longitudinally extending V-type section generally designated by the letter V¹. The gripper 24 is provided with a similar section designated by V². The legs of the V-type sections are respectively provided with teeth 45, 46, 47 and 48.

The orientation of the teeth on a V- section is best seen in Figure 3. As will be evident, the teeth are oriented generally transversely to a plane drawn through the bisector of the V. In the arrangement shown, the teeth are oriented at about an angle of 15° to the plane. This arrangement is preferred because it is conducive of extremely high gripping efficiency. This is brought about by the fact that when a pipe is inserted in the V, practically all of the teeth make a substantial line contact with portions of the pipe. Thus, a smaller load in pounds per square inch is exerted on the teeth.

Where teeth are arranged generally parallel to the root of the V, I have found that usually only one tooth makes line contact with the pipe and, therefore, all of the load is taken by this tooth. Thus, the gripping capacity is limited. However, such arrangements may be used where extremely high loads are not to be exerted.

Where teeth are arranged in checkerboard pattern, for example, as by making cuts parallel and perpendicular to the root of the V, I have found this to be less desirable because less contact is made and consequently greater loads are taken by individual teeth. Such an arrangement, however, may be used where high gripping capacity is not required.

The manner in which the teeth are oriented so as to obtain desired gripping efficiency and the manner in which wedging action takes place will be described in connection with Figures 2, 3 and 4. As seen in Figure 4, the teeth 47 and 48 on gripper 24 point away from a plane B drawn through the bisectors of the V-type sections. The teeth 45 and 46 also point away from this plane. When the pipe P is twisted in the clockwise direction, the teeth 45 and 47 will tend to bite into the pipe. When the pipe is twisted in the counter-clockwise direction, the teeth 46 and 48 tend to bite into the pipe.

The wedging action takes place as follows. When the pipe is twisted in the clockwise direction, the teeth 45 and 47 grip the pipe and thus tend to move the gripper 27 to the left and the gripper 24 to the right. Since the grippers are not capable of axial movement, the portions 27a and 24a will tend to be wedged between the pipe and the respective supports. The more the pipe is attempted to be twisted, the greater the wedging action. When the pipe is twisted in the counter-clockwise direction, the teeth 46 and 48 grip the pipe. Hence, the gripper 27 tends to move to the right and the gripper 24 tends to move to the left with the portions 27b and 24b performing the wedging action. It will be apparent that the portions 24a, 24b, 27a and 27b act effectively as independent wedge-like elements.

When the head is twisted relative to the pipe, say, in the clockwise direction, the teeth 46 and 48 bite into the pipe. Since the grippers are slidable in slots 18 and 20, the head tends to move slightly relative to the grippers until the portions 24b and 27b perform the wedging function and lock the head and the pipe together. Similar action takes place when the head is moved in the counter-clockwise direction.

In passing, it is pointed out that it is not absolutely essential that the teeth point in the manner described above. However, the arrangement is preferred, because the ability of the teeth to bite in enhances the wedging action.

I claim:

1. Gripping means for a vise or the like comprising: a support having a slot and a jaw member yieldably slidable in opposite directions in said slots; spring means to normally center said jaw member in said slot and a V section on said jaw member, the apex of the V extending in a direction generally normal to the direction of movement of said jaw member, each leg of the V having a plurality of teeth arranged generally transversely at an angle substantially less than 90° but not parallel to the apex of the V.

2. A construction in accordance with claim 1 wherein said teeth are arranged at an angle of substantially 15° with the apex.

3. Gripping means for a torsion testing machine or the like comprising: a head member having a longitudinally extending slot adjacent one end thereof; a pair of supports slidably mounted in said slot for movement toward and away from the center thereof; screw mechanism connected with said head for moving said supports; a pair of toothed jaws each respectively mounted in slots in said supports, each jaw being adapted for sliding movement in a direction substantially at right angles to the direction of movement of said supports; and resilient means for each of said jaws adapted to center the jaws in their respective slots.

4. Gripping means for a torsion testing machine or the like comprising: a generally cylindrical head member having a diametrally extending slot adjacent one end thereof; a pair of supports slidably mounted in said slot for movement toward and away from the axis of the head; screw mechanism connected with said head for moving said supports; a pair of jaws each respectively mounted in slots in said supports for sliding motion in a direction transverse the direction of movement of said supports; and a V section on each jaw, the apex of the V extending generally parallel to said axis and each leg of the V having a plurality of teeth arranged generally transversely at an angle less than 90° but not parallel to the apex of the V.

5. Gripping means for a torsion testing machine or the like comprising: a generally cylindrical head member having a diametrally extending slot adjacent one end thereof; a pair of supports slidably mounted in said slot for movement toward and away from the axis of the head; screw mechanism connected with said head for moving said supports; a pair of sliders each respectively mounted in slots in said supports for sliding motion in a direction transverse the direction of movement of said supports; a pair of apertures each respectively formed in said sliders and extending generally in the direction of sliding movement thereof; a pair of springs each respectively mounted in said apertures and each adapted to center the sliders in their respective slots; a pair of grippers each respectively mounted on said sliders; and a V section on each gripper, the apex of the V extending generally parallel to said axis and each leg of the V having a plurality of teeth arranged generally transversely at an angle less than 90° but not parallel to the apex of the V.

References Cited in the file of this patent

UNITED STATES PATENTS

| | | |
|---|---|---|
| 472,010 | Cash | Mar. 29, 1892 |
| 489,822 | Martin | Jan. 10, 1893 |
| 661,901 | Alaman | Nov. 13, 1900 |
| 870,151 | Abell | Nov. 5, 1907 |
| 1,113,903 | Leer | Oct. 13, 1914 |
| 1,194,058 | Neumayer | Aug. 8, 1916 |
| 1,246,563 | Dessez | Nov. 13, 1917 |
| 1,315,314 | Krupp | Sept. 9, 1919 |